Aug. 24, 1954  L. A. LEIFER  2,687,197
CLUTCH AND BRAKE FOR DIRECT DRIVE SPINDLE LATHES
Filed Aug. 27, 1948  3 Sheets-Sheet 3

INVENTOR.
Lorenz A. Leifer
BY
ATTORNEYS.

Patented Aug. 24, 1954

2,687,197

UNITED STATES PATENT OFFICE 2,687,197

CLUTCH AND BRAKE FOR DIRECT DRIVE SPINDLE LATHES

Lorenz Albert Leifer, Madison, Wis., assignor to Gisholt Machine Company, Madison, Wis., a corporation of Wisconsin Application August 27, 1948, Serial No. 46,385

2 Claims. (Cl. 192—18)

This invention relates to a direct drive spindle lathe wherein the spindle carries a sheave which is driven by a multiple V-belt or the like from an electric motor.

Heretofore, direct spindle drives have had the sheave secured to the shaft and have necessitated the starting and stopping of the drive motor for each cycle of operation of the lathe.

Attempts to employ a mechanical clutch, such as a multiple disc clutch between the sheave and spindle have resulted in problems of actuation and of time loss that prove insurmountable. Such clutches do not produce a uniform acceleration rate and consequently are not desirable for starting heavy masses in rotation.

One of the principal objects of the present invention is to provide a direct spindle drive wherein the motor runs constantly and a clutch and brake are employed which have the desired uniform acceleration and deceleration characteristics.

Another object of the invention is to provide a more simple direct spindle drive having a clutch and brake incorporated therein.

Another object is to provide an improved spindle control for a direct spindle drive lathe.

Another object is to reduce the time cycle of operation of a direct spindle drive lathe.

Another object is to simplify the construction of a clutch and brake unit and its application to a direct spindle drive lathe.

Another object is to provide a clutch and brake mechanism which is self-adjusting within a large range of wear so that maintenance cost is kept at a minimum.

Another object is to provide a clutch and brake unit for controlling a direct drive spindle and in which the acceleration and deceleration curves may be kept uniform or they may be adjusted and varied at will.

The accompanying drawings illustrate a direct drive spindle lathe embodying the invention.

Figure 1:
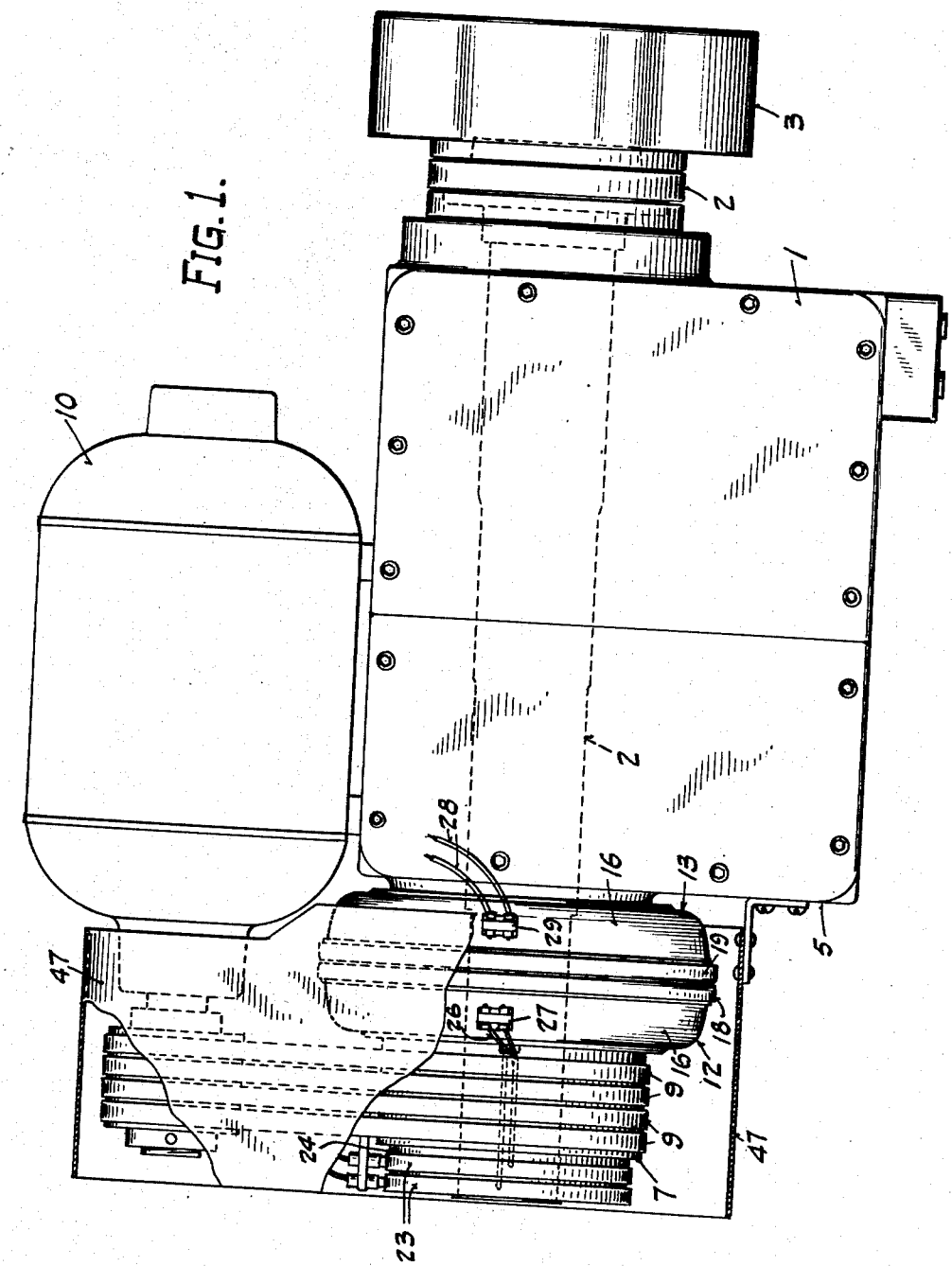
Figure 1 is a top plan view of the headstock of the lathe.
Figure 2:
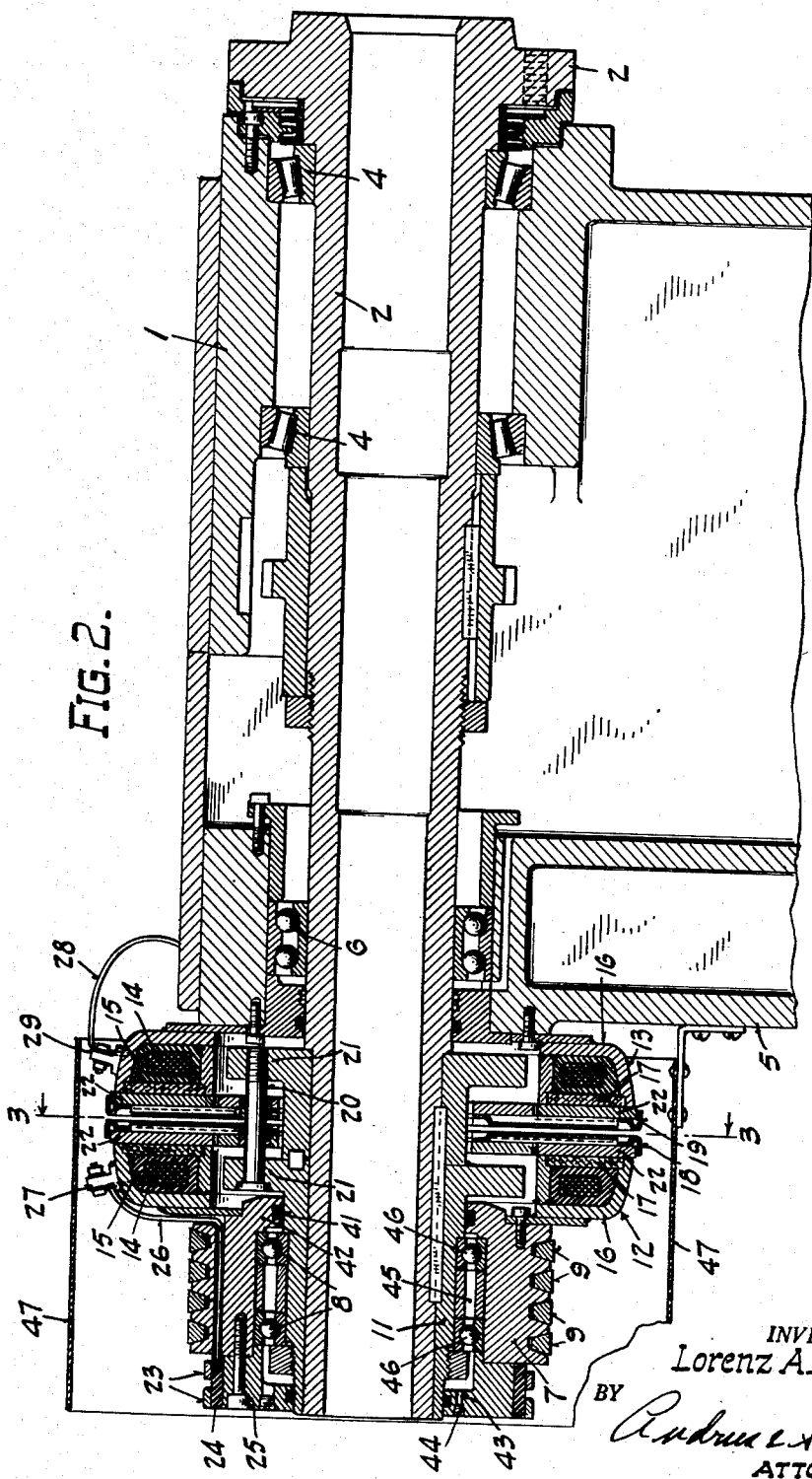
Fig. 2 is a vertical section through the headstock taken axially of the spindle.
Figure 3:
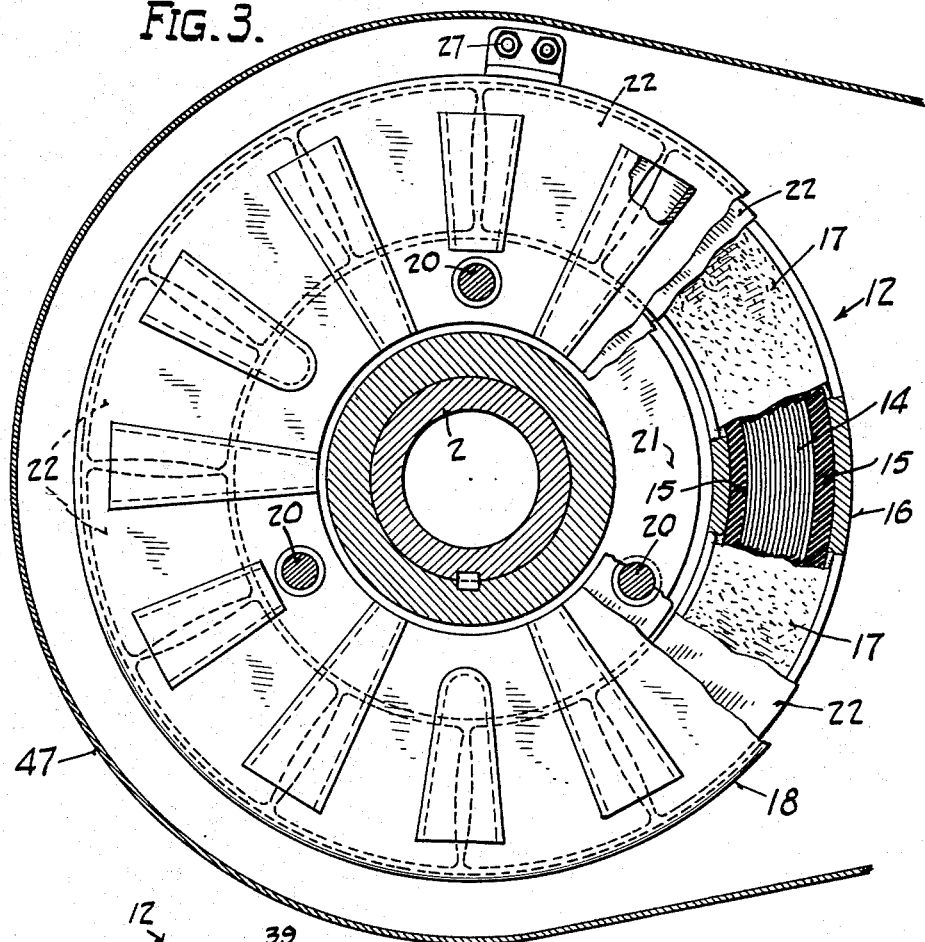
Fig. 3 is a transverse vertical section taken on line 3—3 of Fig. 2 centrally of the clutch and brake unit with parts broken away.

The lathe has a headstock 1 in which a spindle 2 is mounted for rotation.

The front end of the spindle 2 carries a chuck 3 for securing a workpiece, and the spindle is mounted in large anti-friction bearings 4 to adapt the same to handling heavy work.

The rear end of the spindle 2 extends through the rear wall 5 of the headstock in an anti-friction bearing 6 and carries a drive sheave 7 mounted for free rotation thereon by means of ball bearings 8.

The drive sheave 7 comprises a cylindrical member having a circumferentially grooved outer surface for receiving a multiple V-belt 9 adapted to be operated by a power motor 10 carried adjacent the spindle by the headstock.

The bearings 8 are disposed in the radial space between the sheave 7 and a sleeve 11 keyed to spindle 2.

The clutch-brake unit is disposed in a longitudinal space between sheave 7 and the rear wall 5 of headstock 1 and comprises a magnetic clutch element 12 secured to the inner end of sheave 7 and a similarly constructed magnetic brake element 13 secured to the outer side of wall 5 of the headstock.

The clutch element 12, and likewise the brake element 13, comprises a direct current coil 14 embedded in suitable insulation 15 and enclosed in an annular channel section metal shell 16 which is secured to the specified supporting member for the element.

A molded wear-resistant plate 17 is inset in the open side of each channel 16 and provides a wear plate for the face of the clutch element 12 and a similar wear plate for the face of the brake element 13.

The wear plates 17 face each other and are spaced apart to receive a pair of movable armature plates 18 and 19 disposed back to back therebetween.

Armature plate 18 faces the wear plate 17 for clutch element 12 and is adapted to move axially toward and away from the same for clutch action.

Armature plate 19 faces the wear plate 17 for brake element 13 and is adapted to move axially toward and away from the same for brake action.

Armature plates 18 and 19 are constructed alike and each comprises a sheet metal pan facing the corresponding wear plate 17 and secured to rotate with spindle 2 by means of a series of pins 20 extending therethrough longitudinally of the spindle and spaced circumferentially around the spindle. Pins 20 are secured to the spindle 2 by means of a pair of spaced flanges 21 on sleeve 11 and a separate sleeve extension.

Each pan-like plate, 18 and 19, has a series of separate magnetic metal wear elements 22 embedded in a molded composition filling the pan.

The elements 22 extend for the full width of the corresponding channel 16 and engage the opposite edges of the channel sides to provide a closed magnetic circuit surrounding the respective coil 14 and which effects a pull upon the elements 22 by the corresponding clutch or brake element when the magnetic circuit is energized by the flow of current through the coil.

When elements 22 and the corresponding plate 18 or 19 are pulled toward the respective corresponding element 12 or 13, the flat faces of elements 22 engage the corresponding wear plate 17 and thereby close the clutch or brake, as the case may be.

Current is supplied to clutch element 12 to energize the coils thereof by means of a pair of collector rings 23 secured upon an insulating sleeve 24 on a rotary member 25 fastened to the outer end of sheave 7. Lead wires 26 pass from the corresponding collector rings 23 through a hole in sheave 7 to the terminals 27 of the coil 14 of clutch element 12.

Current is supplied directly by suitable leads 28 to the terminals 29 of the stationary coil 14 of brake element 13.

Figure 4:
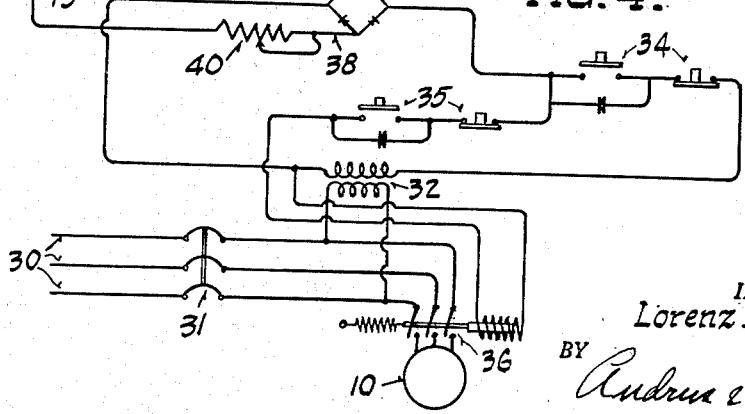
Fig. 4 is a wiring diagram showing the control for the clutch and brake.

Referring to the wiring diagram of Fig. 4, the motor 10 is supplied with current from the three phase power lines 30, and a circuit breaker 31 is employed to cut the motor in and out from the lines.

A transformer 32 is connected across the lines 30 to supply current to a rectifier 33 for operating the coils 14 of clutch element 12 and brake element 13.

A main start and stop switch 34 is connected in the circuit of the transformer secondary to close and open the same. A relay switch 35 is connected across the secondary of the transformer 32 for operating the motor starter 36 for motor 10.

Leads 37 and 38 connect with the opposite output terminals of the rectifier 33 and supply current to the magnet coils 14 through a two-way switch 39 which alternately and selectively energizes the respective clutch and brake coils.

The clutch is constructed with a flux curve which produces a substantially uniform acceleration for the spindle. Likewise, the brake is constructed with a flux curve which produces a substantially uniform deceleration for the spindle. An adjustable or variable resistance 40 may be connected in the return lead 38 of the circuit of the coils 14 for elements 12 and 13 to provide any desired control of the acceleration and deceleration for the spindle.

The clutch plates 17 and 18 and brake plates 17 and 19 should be free from oil at all times, and oil is prevented from reaching the plates from sheave bearing 8 by packing ring 41 disposed at the inner end of the bearing between an inner flange 42 on the sheave and spindle sleeve 11. The bearing 8 is oiled by means of oil passage 43 in rotary member 25 and which is normally closed by the removable plug 44.

The passage 43 extends to the bearing chamber 45 and is preferably horizontal to indicate the level of oil in the chamber 45 when filling. If the bearing chamber 45 is always filled when the sheave 7 is rotated to a position where passage 43 is at the bottom, the oil level in the chamber will never reach the surface of sleeve 11 under either static or rotary conditions and there will therefore be no tendency for oil to leak past ring 41.

Bearing 8, as shown, preferably comprises two longitudinally spaced sets of ball races with a spacer ring between the two outer races so that the outer wall of chamber 45 is in effect provided at the radial level of the outer ball surfaces. This fact results in the spreading of the oil in chamber 45 under centrifugal action produced by rotation of the outer chamber wall with sheave 7 into a thin film through which the bearing balls 46 run, thereby effecting an adequate oiling of the bearing without permitting the oil to reach the spindle sleeve 11 and to leak through packing washer 41.

A housing 47 is secured to the headstock and surrounds the clutch and brake mechanism to additionally protect the frictional plate surfaces of the clutch and brake.

The invention provides a spindle control which is greatly improved over prior direct drive spindles. The electrically operated clutch and brake mechanism provides a very rapid and effective control means having the most efficient acceleration and deceleration characteristics. The positioning and arrangement of the magnetic clutch and brake between the sheave and headstock serves to protect the clutch and brake against injury and provide a compact and simple assembly construction which utilizes the energy of the rotating sheave, belt and motor to assist in providing the necessary acceleration torque. The provision for limiting the oil in the bearings assures the maintaining of the frictional surfaces of the clutch and brake plates and collector rings free from oil.

The invention is hereby claimed as follows:

1. In a power drive including a base, a horizontal rotary member supported by said base, a drive member rotating continuously in one direction, and brake and clutch means selectively connecting said members to rotate the rotary driven member and connecting the rotary member and base to stop the rotation of said member, said brake and clutch means respectively including electro-magnetic elements and friction means to engage the corresponding elements upon energization of the elements, said brake and clutch means requiring the dry operation of elements and friction means thereof for maximum torque capacity; means securing said brake element to said base with the end of the rotary member extending therethrough, said drive member having bearings supporting the same for rotation on said end of the rotary member and carrying said clutch element in axially spaced and opposite relation to said brake element, means carried by said rotary member and supporting said friction means between said brake and clutch elements, said brake element remaining stationary and said clutch element being adapted for continuous rotation with said drive member, said drive member forming a housing and with said rotary member defining an annular sealed chamber enclosing said bearings and including an outer and end walls formed by and rotating with the drive member, said housing being adapted to be filled with a liquid for lubricating said bearings, said liquid being maintained entirely within the housing of said drive member to preclude leakage to said elements and friction means by the continuous rotation thereof and otherwise being of limited supply and wholly within the capacity of the lower part of said chamber beneath said driven member.

2. The invention as defined in claim 1 wherein the clutch element is provided with electrical current supply means including collector rings carried by the drive member for continuous rotation therewith and the rotation of the housing formed by said drive member further precludes the leakage of the lubricating liquid to said rings during the operation of the drive.

References Cited in the file of this patent

UNITED STATES PATENTS

| Number | Name | Date |
|---|---|---|
| 112,971 | Sheldon | Mar. 21, 1871 |
| 914,375 | Ast | Mar. 9, 1909 |
| 1,130,341 | Scofield | Mar. 2, 1915 |
| 1,155,124 | Berger | Sept. 28, 1915 |
| 1,593,307 | Lopes | July 20, 1926 |
| 2,167,790 | Whitehead et al. | Aug. 1, 1939 |
| 2,272,757 | Teher | Feb. 10, 1940 |
| 2,557,860 | Bickel | June 19, 1951 |